L. J. EVEREST.
CLAMP.
APPLICATION FILED FEB. 14, 1910.
968,038.
Patented Aug. 23, 1910.
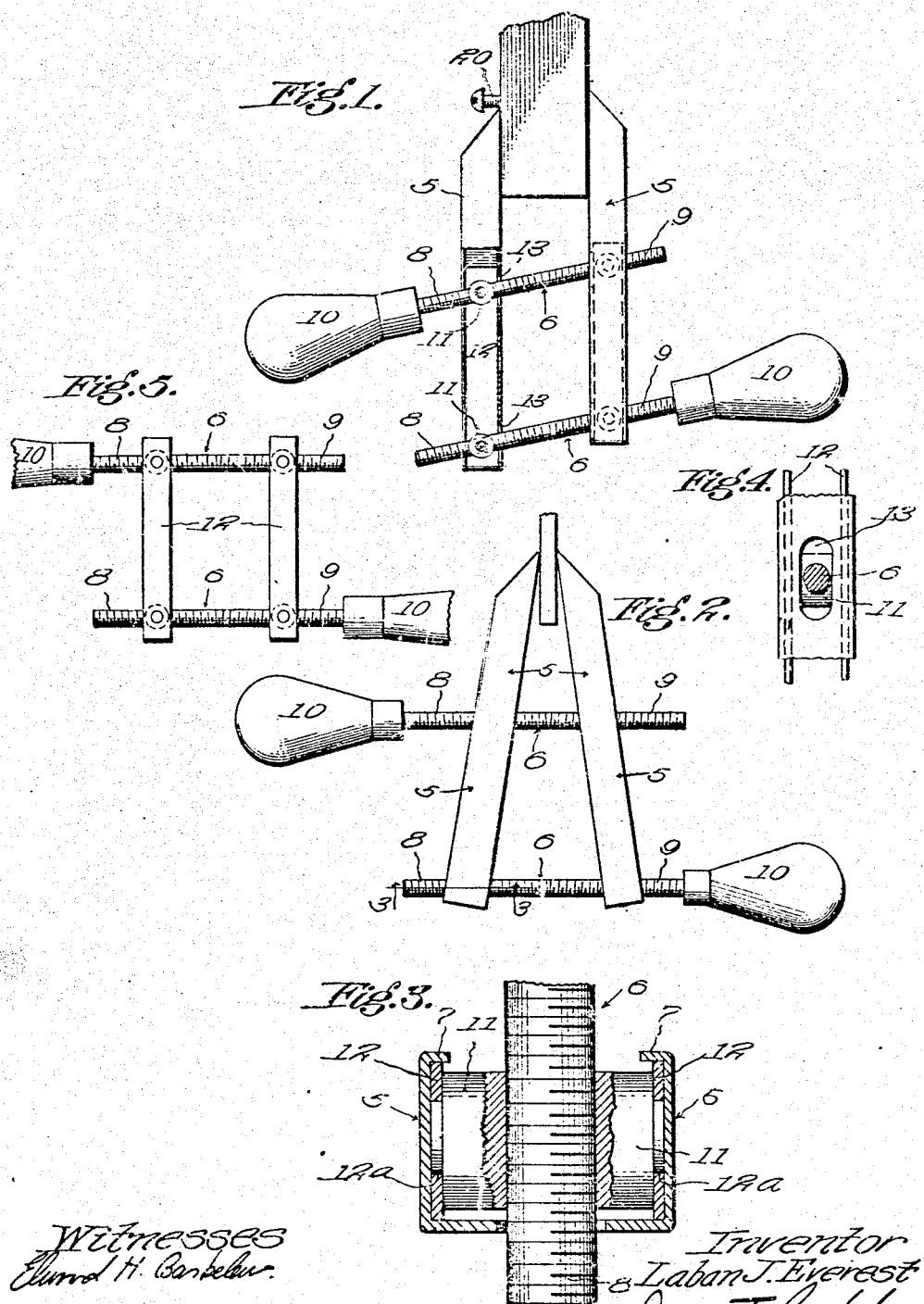

UNITED STATES PATENT OFFICE.

LABAN J. EVEREST, OF LOS ANGELES, CALIFORNIA, ASSIGNOR TO C. L. LANCASTER, OF LOS ANGELES, CALIFORNIA.

CLAMP.

968,038.          Specification of Letters Patent.     Patented Aug. 23, 1910.

Application filed February 14, 1910. Serial No. 543,712.

*To all whom it may concern:*

Be it known that I, LABAN J. EVEREST, a citizen of the United States, residing at Los Angeles, in the county of Los Angeles and State of California, have invented new and useful Improvements in Clamps, of which the following is a specification.

The prime object of this invention is to provide a clamp which has, in addition to the ordinary movements of the jaws toward each other, angular movements of the jaws so that they may be placed in positions advantageous for working the piece clamped between them.

In the old form of clamp, as now generally in use, the jaws of the clamp project equally over the article between them; and it is impossible to work one side of the article at a point where the article is supported directly from the other side by the opposite jaw, as the jaw on that side covers the space opposite. In my new clamp the jaws may be so set that they are not exactly opposite each other, allowing the working of the article between them at a point opposite the end of the jaw projecting farther onto the article. This operation will become clearer from the following specification.

Another feature of my new clamp is the construction enabling the placement of the jaws so that an article is only clamped at the extreme ends of the jaws and is not touched at other points. Thus, when it is desired to clamp an article or articles in their center without clamping the other portions, my clamp may be easily placed in position to effect the desired end. And the same is true if it is desired to clamp the articles only on their edges.

All of these features are made possible by the provision of means whereby the jaws of the clamp may be moved to an angular position with reference to the screws or other means connecting the jaws. In the present construction this is effected by means of a swivel joint between the screws and the jaws. This feature of construction is connected with others which go to make up a commercially practical device, all of which will appear more fully from the following description.

In the accompanying drawings: Figure 1 is an elevation of my clamp in one of its positions, portions being taken away to show the interior construction. Fig. 2 is an elevation showing another position. Fig. 3 is an enlarged detail cross section taken as indicated by line 3—3 on Fig. 2. Fig. 4 is a detail showing a portion of the inside face of one of the jaws. Fig. 5 is a view showing the clamp with the jaws removed showing the interior mechanism.

In the drawings 5 designates the jaws of the clamp which are connected and operated toward and from each other by screws 6. The jaws are preferably formed of sheet metal rolled or otherwise made into the form shown in Fig. 3—a trough shape with overhanging edges 7. The screws are made with right and left handed threads on opposite ends, as at 8 and 9 so that a rotation of handles 10 in a proper direction will move the jaws toward each other, or away from each other, just as desired. The screws pass through trunnions 11 pivotally mounted on slides or plates 12, the trunnions and slides being placed inside the jaws and having apertures 12$^a$ for the reception of the trunnions. They fit tightly inside the jaws, being held in place longitudinally by friction and laterally by overhanging edges 7, forming both a support for the trunnions and a reinforcement for the jaws. The plates are shown without the jaws in Fig. 5. Slots 13 allow the passage of the screws through the faces of the jaws and allow the relative angular movement of the jaws and the screws. By means of the above mechanism it is possible to throw the clamp into the various positions in the drawings.

In Fig. 1 the advantage of having one of the jaws offset from the other is made apparent. A screw may be driven into the article held between the jaws, as at 20, the article being meanwhile backed up by the end of the other jaw.

In Fig. 2 the clamping of an article at some distance from its edge is illustrated. The position shown is typical of others, especially the one where the lower ends of the jaws are close together and the upper ends expanded. In this case the jaws would grip an article on the edge and not at any other point. The position illustrated in Fig. 1 may also be combined with the one shown in Fig. 2 if such is desired.

The amount of which the jaws and the screws may be tilted with reference to each other will depend mainly on the length of slots 13. These may be made of such length that the angularity may be much greater than that shown in the drawings.

The features of the invention will be seen to mainly reside in the provision of means whereby the screws may be placed at an angle to the jaws; and secondarily in the specific means employed for this end. The removable slides or plates are the feature of the construction. They greatly strengthen the clamp as they act as beams placed between the faces of the jaws and the bent over edges 7. If the trunnions were directly mounted on the jaws, the amount of material removed from the trunnion pivot apertures would greatly weaken the jaws. As the construction is now made, the jaws are greatly strengthened and stiffened. The plates also allow the easy assembling of the clamp in initial manufacture and also allow for the use of jaws of different sizes. With the device as illustrated, the device is easily and cheaply manufactured.

Having described my invention, I claim:

1. A clamp, comprising a pair of jaws, the jaws being made in a trough shaped form, the openings of the trough being positioned away from each other, a pair of reinforcing plates lying within each of the troughs, a pair of trunnions pivotally mounted in each pair of plates and having screw threaded bores therein, screws engaging with the bores in the trunnions and thereby connecting the jaws together, the screw threads in the bores and on the screws being right and left handed.

2. A clamp, comprising a pair of jaws, the jaws being made in a trough shape and being positioned with open sides away from each other and also having elongated apertures in their sides opposite the open sides, a pair of screw threaded connecting members extending transversely to the jaws and passing through the apertures therein, a pair of reinforcing plates removably placed in each jaw alongside the side walls of the trough thereof, a pair of trunnions pivotally mounted in each pair of plates, there being a trunnion opposite each of the apertures in the jaws, there being screw threaded bores in the trunnions, with which bores the screw threaded connecting members engage, the screw threads on each end of the members being made in a direction opposite to that of those on the opposite end.

3. A clamp, comprising a pair of jaws, a pair of reinforcing plates mounted in each of the jaws, a pair of connecting members mounted between the plates of each pair, and connecting means between the members of the two jaws.

4. A clamp, comprising a pair of jaws, a pair of reinforcing plates mounted in each jaw, a pair of trunnions mounted in each pair of plates, the trunnions having screw threaded apertures therein, and screws engaging with the apertures in the trunnions and adapted to thereby connect the two jaws together.

5. A clamp, comprising a pair of jaws having a U-shaped cross section, a pair of reinforcing plates placed in each jaw against the side walls thereof, a pair of trunnions pivotally mounted between the plates of each pair, and connecting means between the trunnions of the two jaws.

6. A clamp, comprising a pair of jaws having a U-shaped cross section, a pair of reinforcing plates placed in each jaw against the side walls thereof, a pair of trunnions pivotally mounted between the plates of each pair, the trunnions having screw threaded apertures therein, and screws engaging with the apertures in the trunnions and adapted to thereby connect the two jaws together.

In witness that I claim the foregoing I have hereunto subscribed my name this 4th day of February 1910.

LABAN J. EVEREST.

Witnesses:
 JAMES T. BARKELEW,
 C. L. LANCASTER.